US012499565B2

(12) United States Patent
Ravi Kumar et al.

(10) Patent No.: US 12,499,565 B2
(45) Date of Patent: Dec. 16, 2025

(54) FREE SPACE DETECTION FOR PARKING AND DRIVING IN PUDDLE AREAS WITH PERMUTED FUSION NETWORK

(71) Applicant: QUALCOMM Incorporated, San Diego, CA (US)

(72) Inventors: Varun Ravi Kumar, San Diego, CA (US); Debasmit Das, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/458,654

(22) Filed: Aug. 30, 2023

(65) Prior Publication Data

US 2025/0078294 A1    Mar. 6, 2025

(51) Int. Cl.
*G06T 7/00* (2017.01)
*G06T 7/11* (2017.01)
(Continued)

(52) U.S. Cl.
CPC .................. *G06T 7/50* (2017.01); *G06T 7/11* (2017.01); *B60W 60/0015* (2020.02);
(Continued)

(58) Field of Classification Search
CPC ... G06T 7/50; G06T 7/11; G06T 2207/10028; G06T 2207/20081; G06T 2207/30264;
(Continued)

(56) References Cited

U.S. PATENT DOCUMENTS 9,139,204 B1 * 9/2015 Zhao ...................... B60W 40/06
10,937,178 B1 * 3/2021 Srinivasan .............. G06T 7/521
(Continued)

OTHER PUBLICATIONS

Guan T., et al., "TNS: Terrain Traversability Mapping and Navigation System for Autonomous Excavators", ARXIV:2109.06250v3[cs. RO], Cornell University Library, 201 Olin Library Cornell University Ithaca, NY 14853, May 1, 2022, pp. 1-15.
(Continued)

*Primary Examiner* — Van D Huynh
(74) *Attorney, Agent, or Firm* — Shumaker & Sieffert, P. A.

(57) ABSTRACT

A method includes receiving one or more images, wherein at least one of the one or more images depicts a water region and analyzing, by one or more processors, the one or more images using a first machine learning model to determine a depth of the water region. The method also includes analyzing, by the one or more processors, the one or more images using a second machine learning model to determine a surface normal of the water region and performing, by the one or more processors, using a third machine learning model, multi-class segmentation of the one or more images. Additionally, the method includes performing one or more fusion operations on outputs of at least two of the first machine learning model, the second machine learning model and the third machine learning model to generate a classification of the water region.

30 Claims, 5 Drawing Sheets

(51) Int. Cl.
*G06T 7/50* (2017.01)
*B60W 60/00* (2020.01)

(52) U.S. Cl.
CPC ... *B60W 2420/403* (2013.01); *B60W 2555/20* (2020.02); *G06T 2207/10028* (2013.01); *G06T 2207/20081* (2013.01); *G06T 2207/30264* (2013.01)

(58) Field of Classification Search
CPC ....... B60W 60/0015; B60W 2420/403; B60W 2555/20; G06V 20/56
See application file for complete search history.

(56) References Cited

U.S. PATENT DOCUMENTS

| | | | |
|---|---|---|---|
| 2020/0302612 A1* | 9/2020 | Marrero | G06T 7/12 |
| 2020/0307559 A1 | 10/2020 | Göricke et al. | |
| 2022/0044034 A1* | 2/2022 | RoyChowdhury | E01C 23/01 |
| 2022/0126864 A1* | 4/2022 | Moustafa | B60W 40/09 |
| 2022/0261601 A1* | 8/2022 | Amato | G06F 18/214 |
| 2022/0366786 A1* | 11/2022 | Stenneth | G08G 1/143 |
| 2023/0249710 A1* | 8/2023 | Perumalla | G08G 1/096758 701/24 |
| 2024/0247928 A1* | 7/2024 | Tiwari | B60W 40/06 |
| 2025/0014186 A1* | 1/2025 | Chen | G01S 7/417 |
| 2025/0065900 A1* | 2/2025 | Gideon | G06V 20/588 |

OTHER PUBLICATIONS

Haris M, et al., "Obstacle Detection and Safely Navigate the Autonomous Vehicle from Unexpected Obstacles on the Driving Lane", Sensors, [Online], vol. 20, No. 17, Aug. 21, 2020, p. 4719, XP093207221, pp. 1-22.

International Search Report and Written Opinion—PCT/US2024/041917—ISA/EPO—Dec. 2, 2024 11 Pages.

Jiang P., et al., "RELLIS-3D Dataset: Data, Benchmarks and Analysis", ARXIV.2011.12954v4[cs.CV], Cornell University Library, 201 Olin Library Cornell University Ithaca, NY 14853, May 25, 2022, 7 Pages.

* cited by examiner

FREE SPACE DETECTION FOR PARKING AND DRIVING IN PUDDLE AREAS WITH PERMUTED FUSION NETWORK

TECHNICAL FIELD

This disclosure relates to cognitive neural networks.

BACKGROUND

Autonomous vehicles and semi-autonomous vehicles may use artificial intelligence and machine learning-specifically deep neural networks (DNNs)—for performing any number of operations for operating, piloting, and navigating the vehicle. For example, DNNs may be used for object detection, lane and road boundary detection, safety analysis, drivable free-space analysis, control generation during vehicle maneuvers, and/or other operations. Before any autonomous or semi-autonomous vehicle can safely navigate on the road, the DNNs and other software that enable the vehicle to drive itself are generally tested to verify and validate that they perform safely. More specifically, DNN-powered autonomous and semi-autonomous vehicles should be able to respond properly to an incredibly diverse set of situations, including interactions with emergency vehicles, pedestrians, animals, and a virtually infinite number of other obstacles For autonomous vehicles to achieve autonomous driving levels 3-5 (e.g., conditional automation (Level 3), high automation (Level 4), and full automation (Level 5)) the autonomous vehicles should be capable of operating safely in all environments, and without the requirement for human intervention when potentially unsafe situations present themselves. Advanced Driver Assistance Systems (ADAS) use sensors and software to help vehicles avoid hazardous situations to ensure safety and reliability. One common reason for hazardous situations is accumulation of water on roads. Accumulation of water on roads can lead to a number of hazardous situations, including, but not limited to, skidding and hydroplaning, visibility problems, ice formation, and the like.

SUMMARY

In general, this disclosure describes techniques for the detection and classification of water regions of one or more images. Segmenting images to classify different types of water regions is a challenging task for an autonomous vehicle, as water regions can vary in size, shape, and appearance. This disclosure describes example techniques for segmenting water regions in images. That is, in one or more examples, the example techniques include a combination of different task networks to robustly segment puddles in images. The different tasks involve height estimation, depth estimation, surface normal estimation and multi-class segmentation. In an aspect, a machine learning system of the autonomous vehicle may fuse outputs of the task networks to classify each pixel in an image as either hazardous or not hazardous.

Furthermore, based on the identified hazardous pixels, the machine learning system may identify hazardous water regions. As used herein the term "hazardous water regions" referrers to standing water, deep puddles, flooded areas, and the like. In an aspect, the machine learning system may be further configured to make a decision whether the autonomous vehicle should move forward in extreme weather conditions, such as, but not limited to, heavy flooding, based on vehicle parameters as well as information generated by the task networks. In other words, segmentation of hazardous water regions may help to prevent accidents by preventing autonomous vehicles from parking in hazardous areas. In addition, such segmentation may help to protect pedestrians and cyclists from being injured by vehicles that are driving through hazardous water. Advantageously, the disclosed water region segmentation techniques are not affected by changes in lighting or other environmental conditions. As yet another non-limiting advantage, the disclosed machine learning techniques are computationally efficient.

In one example, a method includes receiving one or more images, wherein at least one of the one or more images depicts a water region and analyzing, by one or more processors, the one or more images using a first machine learning model to determine a depth of the water region. The method also includes analyzing, by the one or more processors, the one or more images using a second machine learning model to determine a surface normal of the water region and performing, by the one or more processors, using a third machine learning model, multi-class segmentation of the one or more images. Additionally, the method includes performing one or more fusion operations on outputs of at least two of the first machine learning model, the second machine learning model and the third machine learning model to generate a classification of the water region.

In another example, an apparatus for detection and classification of water regions includes a memory for storing one or more images; and processing circuitry in communication with the memory. The processing circuitry is configured to receive the one or more images, wherein at least one of the one or more images depicts a water region, and analyze the one or more images using a first machine learning model to determine a depth of the water region. The processing circuitry is also configured to analyze the one or more images using a second machine learning model to determine a surface normal of the water region and perform using a third machine learning model, multi-class segmentation of the one or more images. Additionally, the processing circuitry is configured to perform one or more fusion operations on outputs of at least two of the first machine learning model, the second machine learning model and the third machine learning model to generate a classification of the water region.

In another example, a computer-readable medium includes instructions that, when applied by processing circuitry, cause the processing circuitry to: receive one or more images, wherein at least one of the one or more images depicts a water region, and analyze the one or more images using a first machine learning model to determine a depth of the water region. Additionally, the instructions cause the processing circuitry to analyze the one or more images using a second machine learning model to determine a surface normal of the water region and perform using a third machine learning model, multi-class segmentation of the one or more images, and perform one or more fusion operations on outputs of at least two of the first machine learning model, the second machine learning model and the third machine learning model to generate a classification of the water region.

The details of one or more examples are set forth in the accompanying drawings and the description below. Other features, objects, and advantages will be apparent from the description, drawings, and claims.

DETAILED DESCRIPTION

For autonomous vehicles to achieve autonomous driving levels 3-5 (e.g., conditional automation (Level 3), high automation (Level 4), and full automation (Level 5)), the autonomous vehicles should be capable of operating safely in all environments, and without the requirement for human intervention when potentially unsafe situations present themselves. Advanced Driver Assistance Systems (ADAS) use sensors and software to help vehicles avoid hazardous situations to ensure safety and reliability. One of the most common reasons for hazardous situations is accumulation of water on roads. Accumulation of water on roads can lead to a number of hazardous situations, including, but not limited to skidding and hydroplaning, visibility problems, ice formation, and the like.

In some cases, an autonomous vehicle may need to perform automated parking/driving after heavy rain, for example, in a parking lot. Automated parking in a parking lot containing regions with different levels of water may become an ambiguous task. This disclosure describes example techniques to segment out regions with hazardous levels of water in an image. As one example, the disclosure describes techniques to use a combination of different task networks to robustly segment water regions in images. The different tasks may involve, but are not limited to, height estimation, depth estimation, surface normal estimation and multi-class segmentation.

By fusing together the outputs of different task networks, an improved segmentation of water regions in an image may be performed, as compared to other techniques. In an aspect, a machine learning system of the ADAS may fuse outputs of the task networks to classify each pixel in an image as either hazardous or not hazardous. Furthermore, based on the identified hazardous pixels, the machine learning system may identify hazardous water regions, such as, but not limited to, deep puddles, flooded areas, and the like. Accordingly, the example techniques may help an ADAS system to determine driving decisions in the presence of various types of water regions based on pre-defined rules, for example. In other words, segmentation of hazardous water regions may help to prevent accidents by preventing autonomous vehicles from parking in hazardous areas. In addition, such segmentation may help to protect pedestrians and cyclists from being injured by vehicles that are driving through hazardous water.

Figure 1:
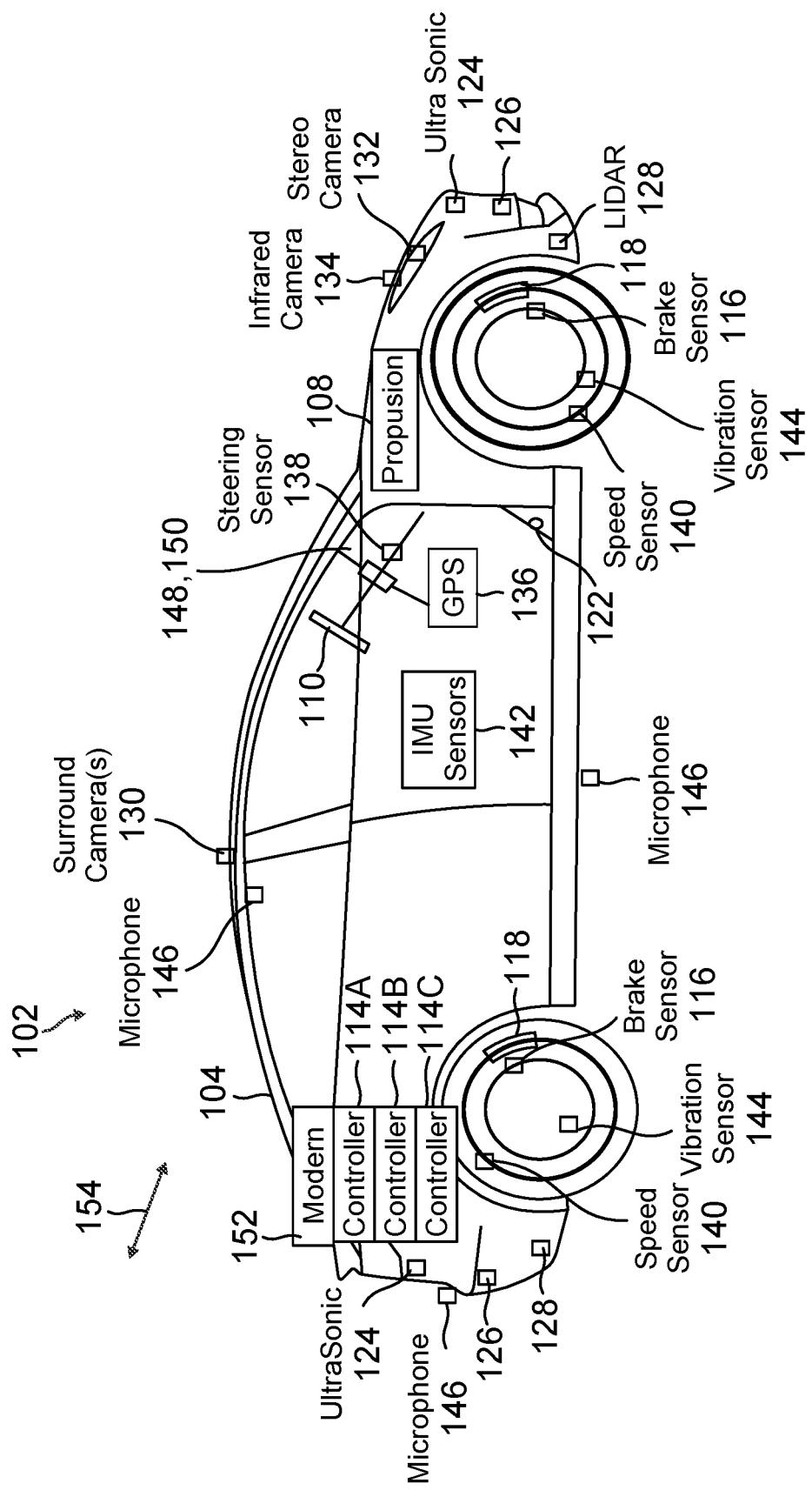
FIG. 1 is a diagram of an example autonomous vehicle, in accordance with the techniques of this disclosure.

FIG. 1 shows an example autonomous vehicle 102. Autonomous vehicle 102 in the example shown may comprise a passenger vehicle such as a car or truck that can accommodate a human driver and/or human passengers. Autonomous vehicle 102 may include a vehicle body 104 suspended on a chassis, in this example comprised of four wheels and associated axles. A propulsion system 108 such as an internal combustion engine, hybrid electric power plant, or even all-electric engine may be connected to drive some or all of the wheels via a drive train, which may include a transmission (not shown). A steering wheel 110 may be used to steer some or all of the wheels to direct autonomous vehicle 102 along a desired path when the propulsion system 108 is operating and engaged to propel the autonomous vehicle 102. Steering wheel 110 or the like may be optional for Level 5 implementations. One or more controllers 114A-114C (a controller 114) may provide autonomous capabilities in response to signals continuously provided in real-time from an array of sensors, as described more fully below.

Each controller 114 may be essentially one or more onboard computers that may be configured to perform deep learning and artificial intelligence functionality and output autonomous operation commands to self-drive autonomous vehicle 102 and/or assist the human vehicle driver in driving. Each vehicle may have any number of distinct controllers for functional safety and additional features. For example, controller 114A may serve as the primary computer for autonomous driving functions, controller 114B may serve as a secondary computer for functional safety functions, controller 114C may provide artificial intelligence functionality for in-camera sensors, and controller 114 (D (not shown) may provide infotainment functionality and provide additional redundancy for emergency situations.

Controller 114 may send command signals to operate vehicle brakes 116 via one or more braking actuators 118, operate steering mechanism via a steering actuator 120, and operate propulsion system 108 which also receives an accelerator/throttle actuation signal 122. Actuation may be performed by methods known to persons of ordinary skill in the art, with signals typically sent via the Controller Area Network data interface ("CAN bus")—a network inside modern cars used to control brakes, acceleration, steering, windshield wipers, and the like. The CAN bus may be configured to have dozens of nodes, each with its own unique identifier (CAN ID). The bus may be read to find steering wheel angle, ground speed, engine RPM, button positions, and other vehicle status indicators. The functional safety level for a CAN bus interface is typically Automotive Safety Integrity Level (ASIL) B. Other protocols may be used for communicating within a vehicle, including FlexRay and Ethernet.

In an aspect, an actuation controller may be obtained with dedicated hardware and software, allowing control of throttle, brake, steering, and shifting. The hardware may provide a bridge between the vehicle's CAN bus and the controller 114, forwarding vehicle data to controller 114 including the turn signal, wheel speed, acceleration, pitch, roll, yaw, Global Positioning System ("GPS") data, tire pressure, fuel level, sonar, brake torque, and others. Similar actuation controllers may be configured for any other make and type of vehicle, including special-purpose patrol and security cars, robo-taxis, long-haul trucks including tractor-trailer configurations, tiller trucks, agricultural vehicles, industrial vehicles, and buses.

Controller 114 may provide autonomous driving outputs in response to an array of sensor inputs including, for example: one or more ultrasonic sensors 124, one or more RADAR sensors 126, one or more Light Detection and Ranging ("LIDAR") sensors 128, one or more surround cameras 130 (typically such cameras are located at various places on vehicle body 104 to image areas all around the vehicle body), one or more stereo cameras 132 (in an aspect, at least one such stereo camera may face forward to provide object recognition in the vehicle path), one or more infrared cameras 134, GPS unit 136 that provides location coordinates, a steering sensor 138 that detects the steering angle, speed sensors 140 (one for each of the wheels), an inertial sensor or inertial measurement unit ("IMU") 142 that monitors movement of vehicle body 104 (this sensor can be for example an accelerometer(s) and/or a gyro-sensor(s) and/or a magnetic compass(es)), tire vibration sensors 144, and microphones 146 placed around and inside the vehicle. Other sensors may be used, as is known to persons of ordinary skill in the art.

Controller 114 may also receive inputs from an instrument cluster 148 and may provide human-perceptible outputs to a human operator via human-machine interface ("HMI") display(s) 150, an audible annunciator, a loudspeaker and/or other means. In addition to traditional information such as velocity, time, and other well-known information, HMI display may provide the vehicle occupants with information regarding maps and vehicle's location, the location of other vehicles (including an occupancy grid) and even the Controller's identification of objects and status. For example, HMI display 150 may alert the passenger when the controller has identified the presence of a water puddle, stop sign, caution sign, or changing traffic light and is taking appropriate action, giving the vehicle occupants peace of mind that the controller is functioning as intended.

In an aspect, instrument cluster 148 may include a separate controller/supercomputer configured to perform deep learning and artificial intelligence functionality.

Autonomous vehicle 102 may collect data that is preferably used to help train and refine the neural networks used for autonomous. The autonomous vehicle 102 may include modem 152, preferably a system-on-a-chip that provides modulation and demodulation functionality and allows the controller 114 to communicate over the wireless network 154. Modem 152 may include an RF front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem 152 preferably includes wireless functionality substantially compliant with one or more wireless protocols such as, without limitation: LTE, WCDMA, UMTS, GSM, CDMA2000, or other known and widely used wireless protocols.

It should be noted that, compared to sonar and RADAR sensors 126, cameras 130 may generate a richer set of features at a fraction of the cost. Thus, autonomous vehicle 102 may include a plurality of cameras 130-134, capturing images around the entire periphery of the autonomous vehicle 102. Camera type and lens selection depends on the nature and type of function. The autonomous vehicle 102 may have a mix of camera types and lenses to provide complete coverage around the autonomous vehicle 102; in general, narrow lenses do not have a wide field of view but can see farther. All camera locations on the autonomous vehicle 102 may support interfaces such as Gigabit Multimedia Serial link (GMSL) and Gigabit Ethernet.

In an aspect, a controller 114 may receive one or more images acquired by a plurality of cameras 130-134. At least one of the one or more images may depict a water region. Next, controller 114 may analyze the one or more images using a first machine learning model to determine a depth of the water region. Controller 114 may analyze the one or more images using a second machine learning model to determine a surface normal of the water region. In addition, controller 114 may perform, using a third machine learning model, multi-class segmentation of the one or more images. Furthermore, controller 114 may perform one or more fusion operations on outputs of at least two of the first machine learning model, the second machine learning model and the third machine learning model to generate a classification of the water region.

Figure 2:
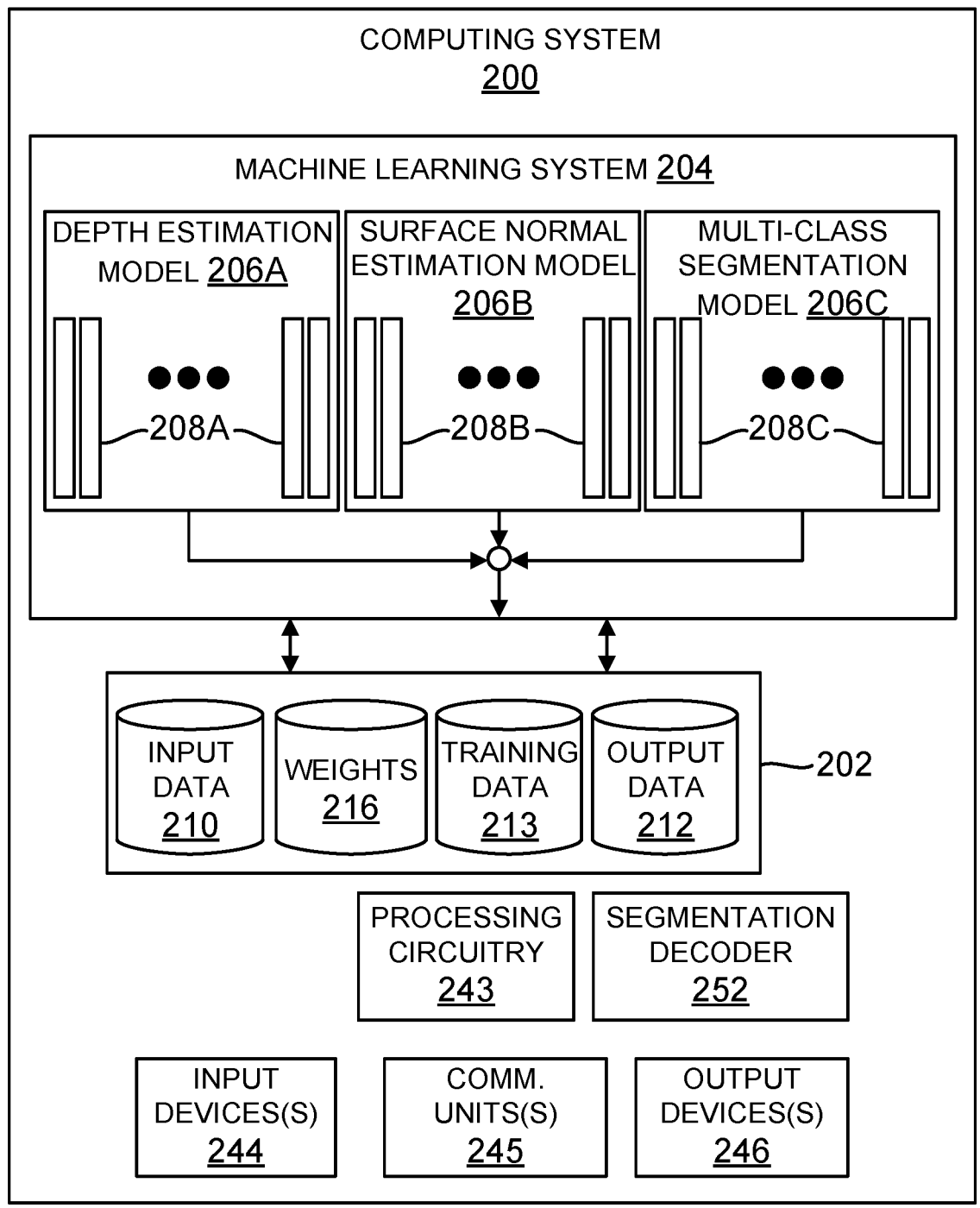
FIG. 2 is a block diagram illustrating an example system that may perform the techniques of this disclosure.

FIG. 2 is a block diagram illustrating an example computing system 200. As shown, computing system 200 comprises processing circuitry 243 and memory 202 for executing a machine learning system 204, which may represent an example instance of any controller 114 described in this disclosure, such as controller 114 of FIG. 1. In an aspect, machine learning system 204 may include one or more task networks, such as, depth estimation model 206A, surface normal estimation model 206B, and multi-class segmentation model 206C (collectively, "task networks 206") comprising respective sets of layers 208A, 208B, 208C (collectively, "layers 208"). Each of task networks 206 may comprise various types of neural networks, such as, but not limited to, recursive neural networks (RNNs), convolutional neural networks (CNNs), and deep neural networks (DNNs).

Computing system 200 may also be implemented as any suitable external computing system accessible by controller 114, such as one or more server computers, workstations, laptops, mainframes, appliances, cloud computing systems, High-Performance Computing (HPC) systems (i.e., super-computing) and/or other computing systems that may be capable of performing operations and/or functions described in accordance with one or more aspects of the present disclosure. In some examples, computing system 200 may represent a cloud computing system, server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster.

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a digital signal processor (DSP), an application specific integrated circuit (ASIC), a field-programmable gate array (FPGA), or equivalent discrete or integrated logic circuitry, or other types of processing circuitry. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

In another example, computing system 200 comprises any suitable computing system having one or more computing devices, such as desktop computers, laptop computers, gaming consoles, smart televisions, handheld devices, tablets, mobile telephones, smartphones, etc. In some examples, at least a portion of computing system 200 is distributed across a cloud computing system, a data center, or across a network, such as the Internet, another public or private communications network, for instance, broadband, cellular, Wi-Fi, ZigBee, Bluetooth® (or other personal area network-PAN), Near-Field Communication (NFC), ultrawideband, satellite, enterprise, service provider and/or other types of communication networks, for transmitting data between computing systems, servers, and computing devices.

Memory 202 may comprise one or more storage devices. One or more components of computing system 200 (e.g., processing circuitry 243, memory 202, task networks 206, segmentation decoder 252, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 243 of computing system 200 may implement functionality and/or execute instructions associated with computing system 200. Examples of processing circuitry 243 include microprocessors, application processors, display controllers, auxiliary processors, one or more sensor hubs, and any other hardware configured to function as a processor, a processing unit, or a processing device. Computing system 200 may use processing circuitry 243 to perform operations in accordance with one or more aspects of the present disclosure using software, hardware, firmware, or a mixture of hardware, software, and firmware residing in and/or executing at computing system 200. The one or more storage devices of memory 202 may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

Processing circuitry 243 and memory 202 may provide an operating environment or platform for one or more modules or units (e.g., task networks 206, segmentation decoder 252, etc.), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute machine learning system 204 using virtualization modules, such as a virtual machine or container executing on underlying hardware. One or more of such modules may execute as one or more services of an operating system or computing platform. Aspects of machine learning system 204 may execute as one or more executable programs at an application layer of a computing platform.

One or more input devices 244 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 246 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

In the example of FIG. 2, task networks 206 may receive input data 210 and may generate output data 212. Fusion of output data 212 of different task networks 206 may be used as input data for segmentation decoder 252. Input data 210 and output data 212 may contain various types of information. For example, input data 210 may include multimodal data. The term "multimodal data" or "multimodal information" is used herein to refer to information that may be composed of a plurality of media or data types such as, but not limited to, image data, video data, audio data, source text data, numerical data, speech data, and so on. Output data 212 may include model predictions, second order estimates, uncertainty estimates, and so on.

Each set of layers 208 may include a respective set of artificial neurons. Layers 208A for example, may include an input layer, a feature layer, an output layer, and one or more hidden layers. Layers 208 may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Each input of each artificial neuron in each layer of the sets of layers 208 is associated with a corresponding weight in weights 216. The output of the k-th artificial neuron in task network 206 may be defined as:

$$y_k = \phi(W_k \cdot X_k) \quad (1)$$

In Equation (1), $y_k$ is the output of the k-th artificial neuron, $\phi(\cdot)$ is an activation function, $W_k$ is a vector of weights for the k-th artificial neuron (e.g., weights in weights 216), and $X_k$ is a vector of value of inputs to the k-th artificial neuron. In some examples, one or more of the inputs to the k-th artificial neuron is a bias term that is not an output value of another artificial neuron or based on source data. Various activation functions are known in the art, such as Rectified Linear Unit (ReLU), TanH, Sigmoid, and so on.

Machine learning system 204 may comprise a pre-trained model that is trained using training data 213 and one or more pre-trained task networks 206, in accordance with techniques described herein. In artificial intelligence, constraints among tasks may be expressed in the form of networks, called (hierarchical) task networks 206. A task network is a set of tasks and constraints among them. Such a network may be used as the precondition for another compound or goal task to be feasible. In other words, a given task may be expressed as feasible only if a set of other actions (those mentioned in the network) are done, and they are done in such a way that the constraints among them (specified by the network) are satisfied.

In an aspect, machine learning system 204 may also include segmentation decoder 252 to enable generation of one or more segmentation masks. A segmentation decoder is a neural network that is used to convert the output of one or more encoder networks (e.g., task networks 206) into a segmentation mask. In an aspect, task networks 206 may be convolutional neural networks (CNNs) that may be used to extract features from an image. The segmentation decoder 252 may be used to take these features and generate a segmentation mask, which is a pixel-level classification of the image. In an aspect, segmentation decoders 252 may be composed of a series of upsampling layers, which are used to increase the resolution of the output. The upsampling layers may be followed by a series of convolutional layers, which may be used to classify each pixel in the output image. For example, each pixel in the output image may be classified as either hazardous or not hazardous.

As noted above, in situations where road surface contains water logging, automated parking task may become highly ambiguous for autonomous vehicles 102. Hazardous water regions may be segmented out in a scene using a variety of techniques, including, but not limited to image segmentation and deep learning. Image segmentation technique involves dividing an image into different regions based on their pixel values. Image segmentation may be performed using a variety of algorithms, such as thresholding, clustering, and edge detection. Deep learning technique described herein involves using a deep neural network to learn the features of hazardous water regions. In an aspect, deep learning may involve using a permuted fusion network illustrated in FIG. 4.

Figure 3:
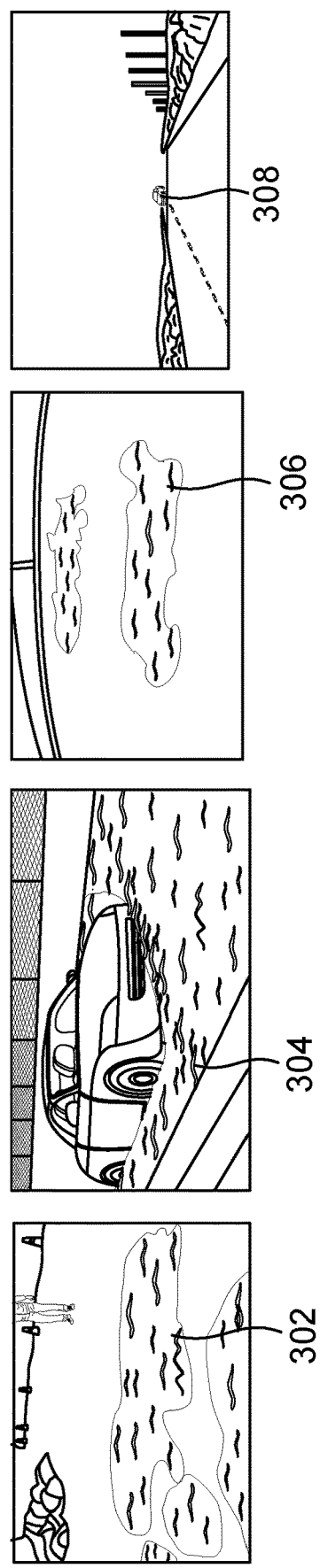
FIG. 3 is a diagram illustrating various non-limiting examples of images containing water regions and/or mirages.

FIG. 3 is a diagram illustrating various examples of various water regions in images. More specifically, FIG. 3 illustrates puddle regions 302, flooding regions 304, wet area regions 306 and mirage 308 in various images. As used herein, the term "puddle regions" or "puddles" refers to a small pool of water, especially rainwater, that has spread on the ground. As used herein, the term "flooding regions" refers to the inundation of a normally dry area caused by rising water in an existing waterway, such as a river, stream, or drainage ditch. The term "flooding regions" may also refer to flash flood regions. Flash flood is a flood caused by heavy or excessive rainfall in a short period of time, generally less than 6 hours. Flash floods are usually characterized by raging torrents after heavy rains that rip through urban streets sweeping everything before them. As used herein, the term "wet area" refers to a larger, more diffused area of water, as compared to a puddle. As used herein, the term "mirage" refers to a naturally-occurring optical phenomenon in which light rays bend via refraction to produce a displaced image of distant objects or the sky. As used herein, the term "non-hazardous water region" refers to water regions that are safe to drive through. As used herein, the term "hazardous water region" refers to water regions that are unsafe to drive through. Once the hazardous water regions (e.g., flooding regions 304) have been segmented out, such segmentation may help autonomous vehicles 102 to decide whether to park in the detected free space or not. For example, if the autonomous vehicle 102 detects a puddle of water that is larger than a certain size, autonomous vehicle 102 may decide not to park in the space.

Segmenting out regions of water is not an easy task because water can have a variety of appearances in images. For example, water can be clear, murky, and reflecting. Clear water is the most common appearance of water in images. Clear water may be difficult to segment because it has a similar appearance to the background. Murky water is often cloudy or dirty. Murky water may be easier to segment than clear water, but such task may still be challenging because the boundaries between the water and the background are not always clear. Water may reflect the surrounding environment, which can make it difficult to segment. For example, if a puddle region 302 is reflecting a tree, machine learning system 204 of the autonomous vehicle 102 may mistake the tree for part of the water. Puddle regions 302 may vary in size, shape, and depth. Puddle regions 302 may also be difficult to see, especially at night or in poor weather conditions.

FIG. 3 further illustrates that segmenting out puddles 302 and flooding regions 304 from shallow wet area regions 306 may be important because puddles of water 302 and/or flooding regions 304 may be a hazard. Mirages are optical illusions that are caused by the refraction of light through layers of air with different temperatures. Mirages 308 may be seen in a variety of conditions, including, but not limited to hot roads. One type of mirage 308 that may occur in the far distance is a superior mirage. Superior mirages occur when the air temperature decreases with altitude. Temperature drops may cause the light from objects to be bent upwards, making them appear higher in the sky than they actually are. Superior mirages may sometimes produce a false appearance of water because the light from the sky may be bent upwards to such an extent that it appears to be reflecting off of a body of water. However, the water may not actually be there. Mirages (such as mirage 308 shown in FIG. 3) may be simply an optical illusion.

At least in some cases, to determine whether to park in the detected free space or not, autonomous vehicle 102 may need to detect the height of water on flooding regions 304. Detecting the height of water may be a challenging task because the height of the water can vary depending on a number of factors, such as, but not limited to, the amount of rainfall, the slope of the road, and the location of the road. Puddle regions 302 may also vary in size, shape, and depth. Puddle regions 302 may be difficult to see, especially at night or in poor weather conditions. In an aspect, autonomous vehicle 102 may decide to avoid certain road surfaces based on the autonomous vehicle's 102 capacity and external sensors.

Figure 4:
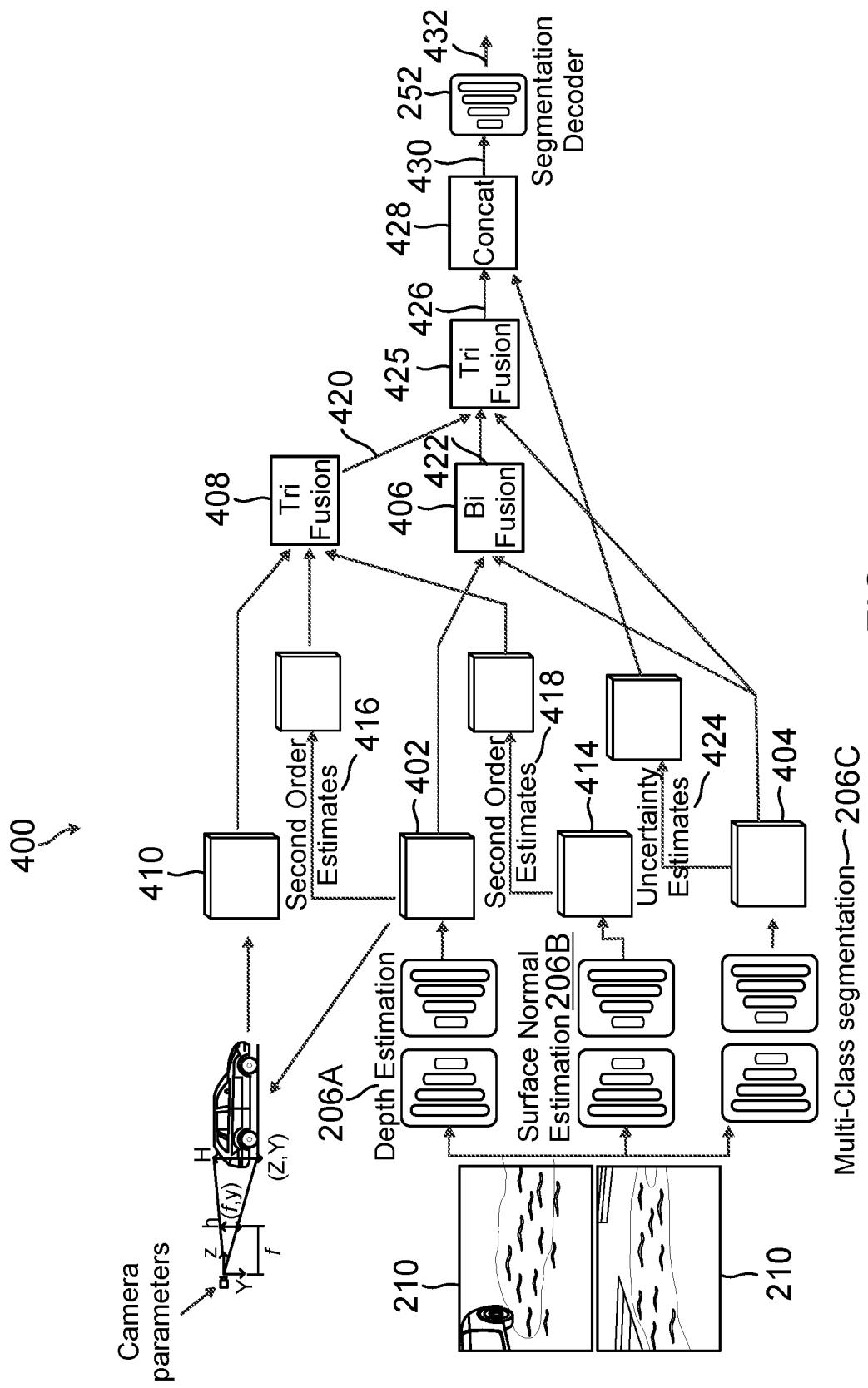
FIG. 4 is a block diagram illustrating an example puddle segmentation framework that may perform the techniques of this disclosure.

FIG. 4 is a block diagram illustrating an example water region segmentation framework that may perform the techniques of this disclosure. FIG. 4 is provided for purposes of explanation and should not be considered limiting of the techniques as broadly exemplified and described in this disclosure. For purposes of explanation, this disclosure describes framework 400 illustrated in FIG. 4 that may be configured to fuse together the outputs of different task networks to perform segmentation of water regions in an image. In the example of FIG. 4, task networks 206 may receive input data 210. In an aspect, input data 210 may include a plurality of images acquired by a plurality of cameras 130-134. At least some of the aforementioned images may include one or more water regions.

As shown in FIG. 4, task networks 206 may include depth estimation model 206A, surface normal estimation model 206B, and multi-class segmentation model 206C. In an aspect, depth estimation model 206A may be configured to use input data 210 (images acquired by at least one of the plurality of cameras 130-134) to determine the distance of objects in the environment. Machine learning system 204 may use this information to navigate the environment safely. In an aspect, the depth estimation model 206A may analyze the size and shape of objects in the images, as well as the shadows and highlights to calculate the distance of each pixel in the image from the camera used to acquire that image. Depth estimation model 206A may be used in conjunction with other computer vision modules, such as, but not limited to, object detection and tracking. Output provided by the depth estimation model 206A may be used by machine learning system 204 to create a 3D map of the environment, which may be used by to detect mirages by looking for changes in the depth of the image.

In an aspect, depth estimation model 206A may also be used to detect mirages by looking for changes in the depth of the image. As noted above, mirages 308 are optical illusions that are caused by the refraction of light through layers of air with different temperatures. When a mirage is present, the depth estimation model 206A may determine that the analyzed image is distorted and may be able to identify the mirage as an illusion. For example, the depth estimation model 206A may track the movement of objects in the environment to identify objects that are not moving as expected and/or identify objects that appear to be located much farther than expected, which may be an indication that a mirage is present. Mirages 308 are often seen near the horizon, where the air temperature changes rapidly. Near the horizon the different layers of air may refract light differently, which may create the illusion of a pool of water or a distant object.

In an aspect, depth estimation model 206A may be configured to use variance of depth technique for detecting puddles. It should be noted that puddles may cause abrupt changes in depth values at the cracks and water surface. The variance of depth is a measure of how spread out the depth values are in an image. If the depth values are all very close together, then the variance is low. However, if the depth values are spread out over a wide range, then the variance is high. Puddles 302 may cause abrupt changes in depth values because the water surface is much closer to the camera than the ground is. Accordingly, the depth values at the water surface may be much lower than the depth values on the ground. For example, depth estimation model 206A may employ a threshold to identify areas where the variance is above a certain level. Once depth estimation model 206A identifies such areas, other computer vision objects of the autonomous car 102 may be used to confirm that the identified areas are indeed puddles.

In an aspect, depth estimation model 206A may comprise a pre-trained model. For example, depth estimation model 206A may be trained on a set of images and their corresponding depth maps. Depth estimation model 206A may learn to associate the input images with their corresponding depth maps. Such associations may allow the depth estimation model 206A to predict depth maps for new images. The ground truth map is a map that shows the distance of each pixel in the image from the camera used to capture the image. The ground truth map may be created by using a laser scanner or other depth sensor. The ground truth map may be used to train the depth estimation network, and it helps the network to learn how to predict accurate depth maps. After the pre-training process is complete, the depth estimation model 206A may be fine-tuned on a smaller dataset of images and their corresponding depth maps. This fine-tuning process may help the model to learn the specific relationships between the images and depth maps in the smaller dataset.

In an aspect, there may be two different types of loss functions that may be used to train the depth estimation model 206A. The L1 loss function may minimize the absolute difference between the predicted depth map ($D_p$) and the ground truth depth map ($D_{gt}$). The L1 loss function, also known as the absolute error loss, is a loss function used in machine learning to measure the error between a predicted value and an actual value. The L1 loss function may be calculated as the sum of the absolute values of the differences between the predicted and actual values. The L2 loss function may minimize the squared difference between $D_p$ and $D_{gt}$. The L2 loss function, also known as the squared error loss, is a loss function used in machine learning to measure the error between a predicted value and an actual value. The L2 loss function may be calculated as the sum of the squared differences between the predicted and actual values. In other words, depth estimation model 206A may be trained to minimize the error between the predicted depth map and the ground truth depth map, by using the L1 or L2 regression loss function. The L1 loss function is a simple and effective loss function, but it may be sensitive to outliers. The L2 loss function is more robust to outliers, but it may be less sensitive to small changes in the depth map.

In an aspect, surface normal estimation model 206B may be configured to use input data 210 to perform surface normal estimation. Surface normal estimation is a computer vision technique that is used to measure the angular incline of the surface with which the pixel is associated. Surface normal estimation may be used to understand the 3D structure of the scene and to perform tasks such as object detection (e.g., puddle detection) and tracking. In an aspect, surface normal estimation model 206B may perform surface normal estimation by analyzing the intensity values of the pixels in an input image. The intensity values of a pixel are affected by the angle of the surface that the pixel is facing. For example, a pixel that is facing a surface that is perpendicular to the camera may have a different intensity value than a pixel that is facing a surface that is parallel to the camera. By analyzing the intensity values of the pixels in an image, surface normal estimation model 206B may estimate the direction of the surface normal vector for each pixel. The surface normal vector is a vector that points directly away from the surface at the pixel. Surface normal estimation model 206B may use the angle of the surface normal vector to measure the angular incline of the surface.

In an aspect, surface normal estimation model 206B may be configured to use variance of depth technique for detecting puddles. It should be noted that puddles may cause abrupt changes in surface normal values because the water surface is much smoother than the ground. The surface normal vectors at the water surface may be much more aligned than the surface normal vectors on the ground. For example, if surface normal estimation model 206B processes image depicting a road with a puddle 302 on it, the surface normal vectors on the ground may be relatively aligned, while the surface normal vectors at the water surface may be relatively misaligned. As a result, the variance of surface normal may be high in the area of the puddle. For example, surface normal estimation model 206B may employ a threshold to identify areas where the variance of surface normal values is above a certain level. Once surface normal estimation model 206B identifies such areas, other computer vision objects of the autonomous vehicle 102 may be used to confirm that the identified areas are indeed puddles. Advantageously, puddle detection using the variance of surface is not affected by changes in lighting or other environmental conditions because the surface normal vector is a measure of the direction of the surface, not the intensity of the light.

Once the puddles 302 have been detected, surface normal estimation model 206B may use the surface normal vectors in the area of the puddles 302 to generate a road profile. The road profile may be used to determine the depth of the puddles 302 and the slope of the road. In an aspect, the road profile may include, but is not limited to, information such as the depth of the puddles and/or flooded areas, the slope of the road, and the like.

In an aspect, surface normal estimation model 206B may comprise a pre-trained model. For example, surface normal estimation model 206B may be trained on a set of images and their corresponding surface normal maps. Surface normal estimation model 206B may learn to associate the input data 210 (e.g., images) with their corresponding surface normal maps. Such associations may allow the surface normal estimation model 206B to predict surface normal maps for new images. The ground truth map is a map that shows the distance of each pixel in the image from the camera used to capture the image. In this case, the ground truth surface normal map may be a map that shows the direction of the surface normal vector for each pixel in the image. The surface normal vector is a vector that points directly away from the surface at the pixel. The angle of the surface normal vector may be used to measure the angular incline of the surface. After the pre-training process is complete, the surface normal estimation model 206B may be fine-tuned on a smaller dataset of images and their corresponding surface normal maps. This fine-tuning process may help the model to learn the specific relationships between the images and surface normal maps in the smaller dataset.

In an aspect, the surface normal estimation model 206B may be trained using cosine similarity loss function. The cosine similarity loss function may be calculated by taking the dot product of the predicted surface normal vector ($N_p$) and the ground truth surface normal vector ($N_{gt}$). The cosine similarity loss may be minimized when the two vectors are pointing in the same direction. In other words, the cosine similarity loss may be minimized when the difference between the angles is zero. The surface normal estimation model 206B may be trained to minimize the difference between the angles of the predicted surface normal vector and the ground truth surface normal vector by using the cosine similarity loss function. Advantageously, the cosine similarity loss function is a computationally efficient loss function, which is important for real-time applications.

In an aspect, multi-class segmentation model 206C may be configured to use input data 210 (images acquired by at least one of the plurality of cameras 130-134) to assign a label from a predefined set of classes to each pixel and/or to classify each image pixel into a pre-defined category.

Machine learning system 204 may use multi-class segmentation to identify the different objects in an image and to label each object with its corresponding class. In scene understanding, multi-class segmentation can be used to identify the different components of a scene, such as roads, buildings, and trees. In addition to objects, images may contain noise and clutter, which can make it difficult to segment the objects in the image.

In an aspect, multi-class segmentation model 206C may be used, in the context of water segmentation, to identify different water classes representing different types of water bodies, such as puddles 302, flooding regions 304 wet area regions 306, and mirages 308. Multi-class water segmentation is a challenging task, as different water bodies may have a wide range of appearances, depending on the lighting conditions, the time of day, and the surrounding environment.

In an aspect, multi-class segmentation model 206C may be used to detect mirages 308. When mirage 308 is present in the input data 210, multi-class segmentation model 206C may determine that the analyzed image is distorted and may be able to identify the mirage 308 as an illusion. Mirages 308 may be detected in the region where the sky and road intersect, because the air temperature is usually cooler near the ground than it is in the air above the road. If no plants and/or animals are detected near a pool of water, such pool is more likely to be mirage 308.

In an aspect, multi-class segmentation model 206C may also comprise a pre-trained model. For example, multi-class segmentation model 206C may be trained on a set of images and their corresponding ground truth segmentation maps. The ground truth segmentation map is a label map that indicates the class of each pixel in the input image. For example, a ground truth segmentation map for a road scene might have three classes: road, sidewalk, and puddle. Each pixel in the map generated by the multi-class segmentation model 206C would be assigned one of these three classes. Multi-class segmentation model 206C may learn to associate the input images with their corresponding segmentation maps. Such associations may allow the multi-class segmentation model 206C to predict ground truth segmentation maps for new images by minimizing a loss function that measures the difference between the model's prediction and the ground truth segmentation map.

In an aspect, the multi-class segmentation model 206C may be trained using cross entropy loss function. The cross-entropy loss function may measure the difference between two probability distributions. In the case of image segmentation, the two probability distributions are the predicted segmentation map ($S_p$) and the ground truth segmentation map ($S_{gt}$). The multi-class segmentation model 206C may be trained to minimize the cross-entropy loss between $S_p$ and $S_{gt}$. In other words, the multi-class segmentation model 206C may try to learn to predict a segmentation map that is as close as possible to the ground truth segmentation map. In an aspect, the cross-entropy loss may be represented by formula (1):

$$\text{loss} = -sum(S_{gt} * \log(S_p) + (1 - S_{gt}) * \log(1 - S_p)) \qquad (1)$$

where log is the natural logarithm and sum is the summation over all pixels in the image. A low cross entropy loss indicates that the predicted segmentation map is a good match for the ground truth segmentation map. A high cross entropy loss indicates that the predicted segmentation map is a poor match for the ground truth segmentation map. In an aspect, multi-class segmentation model 206C may be trained to minimize the cross-entropy loss by adjusting one or more parameters using an optimization algorithm, such as, but not limited to stochastic gradient descent.

In an aspect, in addition to performing depth estimation, surface normal estimation and multi-class segmentation, the puddle segmentation framework illustrated in FIG. 4 may employ height estimation to determine how high each pixel is from the ground. Generally, height estimation is the process of determining the height of an object or a point in space. In the context of image segmentation, the machine learning system 204 may perform height estimation to understand the layout of the scene being analyzed. For example, the machine learning system 204 may use a height estimation algorithm to determine the depth of a puddle. In an aspect, in order to distinguish shallow puddles from deep puddles machine learning system 204 may determine the height of the water surface relative to the ground. A shallow puddle will have a lower water surface than a deep puddle, and machine learning system 204 may utilize this difference in height to classify the puddles. For example, machine learning system 204 may use a height estimation algorithm to determine that a puddle is shallow if the water surface is within 10 cm of the ground. A puddle that is more than 10 cm from the ground may be classified as deep.

In an aspect, the machine learning system 204 may be configured to ignore shallow puddles, which are not likely to be obstacles for autonomous vehicles 102. Ignoring shallow puddles may improve the accuracy of image segmentation algorithms performed by the multi-class segmentation model 206C by reducing the number of false positives. A false positive is an object that is incorrectly identified as being something else. In the context of image segmentation, a false positive would be a shallow puddle that is incorrectly identified as being a deep puddle or a road. By ignoring shallow puddles, the multi-class segmentation model 206C may focus on the more important objects in the scene, such as flooded areas, cars, pedestrians, and buildings. The aforementioned technique may improve the accuracy of the segmentation algorithms performed by multi-class segmentation model 206C and may make the segmentation more useful for applications such as autonomous cars.

In addition, machine learning system 204 may be configured to segment and/or further classify deep puddles, which are large puddles that may become obstacles for autonomous vehicles 102. Segmentation of deep puddles may improve the safety of autonomous vehicles 102 by allowing the vehicles to avoid deep puddles because deep puddles may cause autonomous vehicles 102 to hydroplane or lose control. By segmenting the puddles, the machine learning system 204 may be made aware of the hazards and take steps to avoid them.

In an aspect, machine learning system 204 may utilize the output generated by the depth estimation model 206A to measure the height of an object using the concept of similarity of triangles. The similarity of triangles is a mathematical principle that states that two triangles are similar if the ratios of their corresponding side lengths are equal. Next, the depth estimation model 206A may use the calculated distance to calculate the size of the object in the real world, which may be used, in turn, to calculate the height of the object. For example, if the depth estimation model 206A estimates that the distance between the camera and an object is 10 meters and if the object in the analyzed image is 100 pixels tall, the size of the object in the real world may then be calculated by formula (2):

$$\text{Size of object in real world} = \qquad (2)$$
$$\text{Size of object in image} * \text{Distance between camera and object}$$

Furthermore, the depth estimation model may then calculate the height of the object using the following formula (3):

$$\text{Height of object} = \text{Size of object in real world}/2 \qquad (3)$$

It should be noted that the accuracy of the height measurement may depend on the accuracy of the depth estimation model 206A. The accuracy of the depth estimation model 206A may also depend on the quality of the image. If the image is blurry or has a lot of noise, the height measurement may be less accurate. In the context of puddle detection, the rough estimation of the height of a puddle could be useful for identifying puddles that are deep enough to be hazardous.

In an aspect, as shown in FIG. 4, outputs of all the task networks 206 may be fused together and fed to the segmentation decoder 252. The task networks 206 may be responsible for extracting different features from the image. By fusing the outputs of all the task networks 206, the segmentation decoder 252 may get a more complete understanding of the image. Such improved understanding may help the segmentation decoder 252 to produce more accurate segmentation masks. In an aspect, machine learning system 204 may employ an early fusion approach. In an early fusion approach, the outputs of the task networks 206 may combined, as illustrated in FIG. 4 and described below, before these outputs are fed to the segmentation decoder 252. The early fusion approach may be a more complex approach, but it may also be more effective.

In an aspect, machine learning system 204 may employ two different attentive mechanisms (bi-fusion and tri-fusion) for image segmentation. Both mechanisms use all permutations of feature candidates for keys, values, and queries.

Bi-fusion is a two-stream attentive mechanism. In bi-fusion, two different feature streams may be used to represent the input image. The two feature streams may then be fused together using an attention mechanism. The attention mechanism allows the two feature streams to learn to attend to each other, which may help to improve the accuracy of the segmentation.

Tri-fusion is a three-stream attentive mechanism. In tri-fusion, three different feature streams are used to represent the input image. The three feature streams may then be fused together using an attention mechanism. The attention mechanism allows the three feature streams to learn to attend to each other, which may help to improve the accuracy of the segmentation. In an aspect, bi-fusion and tri-fusion may help to improve the accuracy of image segmentation by providing the attention mechanism with more information. In addition, bi-fusion and tri-fusion mechanisms may help to make image segmentation more robust to noise and occlusion.

In an aspect, the output generated by the depth estimation model 206A may include a first feature map 402 and the output generated by the multi-class segmentation model 206C may include a second feature map 404. In an aspect, machine learning system 204 may perform the bi-fusion operation 406 between two feature maps F1 and F2 by performing the following steps:
1. Select a query from F1.
2. Select keys and values from F2.
3. Apply attention to the keys and values, using the query as the reference.
4. The output of the attention operation is a weighted sum of the values, where the weights are determined by the attention scores.
5. Repeat steps 2-4, but this time select the query from F2 and the keys and values from F1.
6. The outputs of the two attention operations, A1 and A2, may be concatenated and fed forward.

In other words, attention mechanism may include a function to calculate the attention scores between the query and the keys. Machine learning system 204 may use the attention scores to weight the values, which are then summed together to produce the output of the attention operation 422. It should be noted that the choice of the attention function may affect the accuracy of the segmentation. In an aspect, the attention function may include, but is not limited to one of the following: the dot product attention, the scaled dot product attention, and the softmax attention.

In an aspect, machine learning system 204 may perform the bi-fusion operation 406 to detect mirages 308 by fusing the outputs of the depth estimation model 206A and the multi-class segmentation model 206C. Machine learning system 204 may perform the fusion of the outputs of the two networks by using the depth information to weight the segmentation predictions. For example, if the depth estimation model 206A predicts that a pixel is close to the camera, then the segmentation prediction for that pixel may be more heavily weighted. Machine learning system 204 may use the bi-fusion operation 406 to detect mirages by looking for regions in the image where the segmentation predictions are strongly water-like, but the depth predictions are not consistent with the presence of water. For example, if the depth estimation model 206A predicts that a pixel is far from the camera, but the segmentation prediction for that pixel is water-like, then machine learning system 204 may determine that the analyzed pixel is part of mirage 308.

In an aspect, machine learning system 204 may perform a first tri-fusion operation 408 between three feature maps F1, F2 and F3 by performing the following steps:
1. Select a query from F1.
2. Select keys and values from F2.
3. Apply attention to the keys and values, using the query as the reference.
4. The output of the attention operation is a weighted sum of the values, where the weights are determined by the attention scores.
5. Repeat steps 2-4, but this time select the query from F2, the keys from F3 and the values from F1.
6. Repeat steps 2-4, but this time select the query from F3, the keys from F1 and the values from F2.
7. The outputs of all attention operations may be concatenated and fed forward.

In other words, attention mechanism may include a function to calculate the attention scores between the query and the keys. Machine learning system 204 may use the attention scores to weight the values, which may then be summed together to produce the output of the attention operation. It should be noted that the choice of the attention function may affect the accuracy of the segmentation. In an aspect, the attention function may include, but is not limited to, one of the following: the dot product attention, the scaled dot product attention, and the softmax attention.

In an aspect, machine learning system 204 may perform the first tri-fusion operation 408 by first creating three separate feature maps (F1, F2, and F3). Machine learning system 204 may create the height feature map 410 by converting the height information in the image to a grayscale image. Machine learning system 204 may create the depth variance feature map 402 by calculating the variance of the depth values in a small neighborhood around each pixel. Machine learning system 204 may create the surface normal variance feature map 414 by calculating the variance of the surface normal vectors in a small neighborhood around each pixel.

In an aspect, machine learning system 204 may employ one or more second order estimates of corresponding feature maps. The second order estimate of a feature map may be obtained by computing the variance of the activations in a certain K×K window and moved around spatially. Such computations may be repeated across all channel dimensions. The variance is a measure of how spread out the activations are in a given window. A high variance indicates that the activations are spread out over a wide range of values, while a low variance indicates that the activations are clustered around a single value.

More specifically, machine learning system 204 may use the second order estimate 416, 418 of a feature map to capture the spatial relationships between the activations in the feature map. For example, high variance is high in a particular region of the feature map may indicate that there is a lot of variation in the activations in that region. Such variation could be due to the presence of multiple objects in that region and/or due to the presence of noise. The second order estimate 416, 418 of a feature map may be repeated across all channel dimensions, which allows the spatial relationships between the activations in each channel to be captured. Second order estimates 416, 418 are useful in image segmentation because they help to identify the different objects in an image.

In an aspect, machine learning system 204 may perform the first tri-fusion operation 408 by fusing together corresponding second order estimates 416 and 418 of the feature maps 402 and 414 with the height feature map 410 to create a single feature map 420. In an aspect, the machine learning system 204 may perform the first tri-fusion operation 408 using attention technique described herein. Machine learning system 204 may use the fused feature map 420 to classify each pixel in the image as either hazardous or not hazardous. Hazardous pixels may be pixels that are dark, have a high depth variance, and have a low surface normal variance. Furthermore, based on the identified hazardous pixels, machine learning system 204 may identify hazardous puddles. As noted above, height estimation is the process of determining the height of an object or a point in space. In the context of image segmentation, the machine learning system 204 may generate the height feature map 410 by performing height estimation using, for example, camera parameters, including, but not limited to, focal length and using the aforementioned concept of similarity of triangles. In an aspect, the height feature map 410 may include the height of the autonomous vehicle 102, for example.

In an aspect, machine learning system 204 may further improve the accuracy of the segmentation by performing a second tri-fusion operation 425, which may involve fusing together the single feature map 420, the output of the attention operation 422 and second feature map 404 to create a desired features map 426. The single feature map 420 may provide information about the overall appearance of puddles. The output of the attention operation 422 may provide information about the specific parts of the puddles that are important for segmentation. The uncertainty estimates 424 of the multi-class segmentation feature map 415 may provide information about the confidence of the segmentation algorithm. In an aspect, the second tri-fusion operation 425 may create the desired features map 426 that is more accurate and more robust to noise and occlusion.

In an aspect, machine learning system 204 may determine the uncertainty estimates 424 using methods, including, but not limited to Monte-Carlo dropout and Laplacian approach. Monte-Carlo dropout is a technique that may use dropout during inference to uncertainty estimate 424. Dropout is a technique that randomly drops out some of the neurons in a neural network during training. Dropout technique helps to prevent the neural network from overfitting the training data. When dropout is used during inference, the machine learning model may make a prediction multiple times. Each time, a different set of neurons may be dropped out. The machine learning model may calculate the uncertainty estimates 424 by measuring how much the predictions change when different sets of neurons are dropped out. Laplacian approach is a technique that may use the Laplacian distribution to estimate uncertainty. The Laplacian distribution is a probability distribution that may be used to model uncertainty. The Laplacian approach may estimate uncertainty by calculating the standard deviation of the predictions of the machine learning model. The standard deviation is a measure of how much the predictions vary. The higher the standard deviation, the more uncertain the machine learning model may be about its predictions.

In an aspect, machine learning system 204 may next concatenate 428 the desired feature map 426 with the uncertainty estimates 424 of the multi-class segmentation feature map 404. The uncertainty estimates 424 may be used by the machine learning system 204 to weight the desired feature map 426. For example, if the uncertainty estimates 424 for a pixel are high, then the desired feature map 426 for that pixel can be given less weight to reduce the impact of errors made by the model. Machine learning system 204 may also use the uncertainty estimates 424 to identify pixels where the model is not sure about the class label. Such pixels may then be further processed by the model or by a human expert.

In an aspect, the concatenated features 430 may be used as input into the segmentation decoder 252. The segmentation decoder 252 may comprise, for example, a neural network that takes in the concatenated features 430 and outputs a prediction of the free space (not containing any hazardous water regions) 432. The segmentation decoder 252 may be trained on a dataset of images that have been labeled with free space and non-free space. In an aspect, the output 432 of the segmentation decoder 252 may be a probability map. The probability map may be a grayscale image where each pixel has a value between 0 and 1. The value of a pixel in the probability map may represent the probability that the pixel is free space.

In an aspect, after all task networks 206 have been pre-trained, machine learning system 204 may proceed with fine-tuning the task networks 206 and training rest of the networks from scratch using puddle segmentation data. Fine-tuning is a technique that may be used to improve the performance of a pre-trained model. Fine-tuning may involve training one or more models on a small dataset of new data. More specifically, in an aspect, the task networks 206 may be fine-tuned using a dataset of images that contain puddles. The fine-tuning process would involve adjusting the weights of the task networks 206 to better fit the new data. It should be noted that fine-tuning may be more efficient than training from scratch, as the model being trained may already learn some of the features from the pre-trained model. The puddle segmentation data may be collected by labeling images of puddles. In an aspect, machine learning system 204 may create labels by drawing a binary mask around the puddle in the image. The binary mask may then be converted to a grayscale image with a value of 1 for pixels that are part of the puddle and a value of 0 for pixels that are not part of the puddle.

The cross-entropy loss function may then be minimized by adjusting the weights of the multi-class segmentation model 206C so that the predicted probability for class 1 is as high as possible for the pixels that are part of the puddle and the predicted probability for class 0 is as high as possible for the pixels that are not part of the puddle. In other words, the cross-entropy loss may be minimized by adjusting the weights of the segmentation network so that the predicted segmentation map Pp (predicted segmentation map) is as close to the ground truth segmentation map Pet as possible.

In an aspect, machine learning system 204 may be configured to make a decision whether the autonomous vehicle 102 should move forward in extreme weather conditions, such as, but not limited to, heavy flooding based on vehicle parameters as well as information generated by the task networks 206. In an aspect, such decision may be based on one or more preconfigured rules and not learned. Different vehicle parameters may include, but are not limited to, the height of the vehicle, the weight of the vehicle, the type of the vehicle, and the like. Some vehicles may be more likely to stall or hydroplane than others. For example, vehicles with low ground clearance may be more likely to stall or hydroplane than vehicles with high ground clearance. In addition to the vehicle parameters, the preconfigured rules may look at puddle information, such as, but not limited to estimated height of the puddle.

In summary, extreme weather conditions, such as heavy rain and flooding, can make it difficult for autonomous vehicles 102 to see where the autonomous vehicle 102 may safely drive because the waterlogging and puddles may obscure the road surface. In an aspect, machine learning system 204 of the autonomous vehicle 102 may use surface normal estimates to estimate the road surface and the logging area. As noted above, the surface normal is a vector that describes the direction of the surface at a particular point. By estimating the surface normal, the machine learning system 204 may determine whether the road surface is wet or dry, and whether there are any puddles. The disclosure describes a solution to the free space detection problem using a combination of surface normal variance feature map 414 and uncertainty estimates 424. The surface normal variance feature map 414 may be used to estimate the road surface and the logging area. The uncertainty estimates 424 may be used to determine how confident the model is in its predictions. In addition, the proposed solution may also predict whether to wade through the detected puddles by considering the depth of each puddle, the speed of the autonomous vehicle 102, and the weight of the autonomous vehicle 102. If the puddle is deeper than a predefined threshold and/or the if the autonomous vehicle 102 is heavier than a predefined threshold, the autonomous vehicle 102 may not wade through the puddle.

Figure 5:
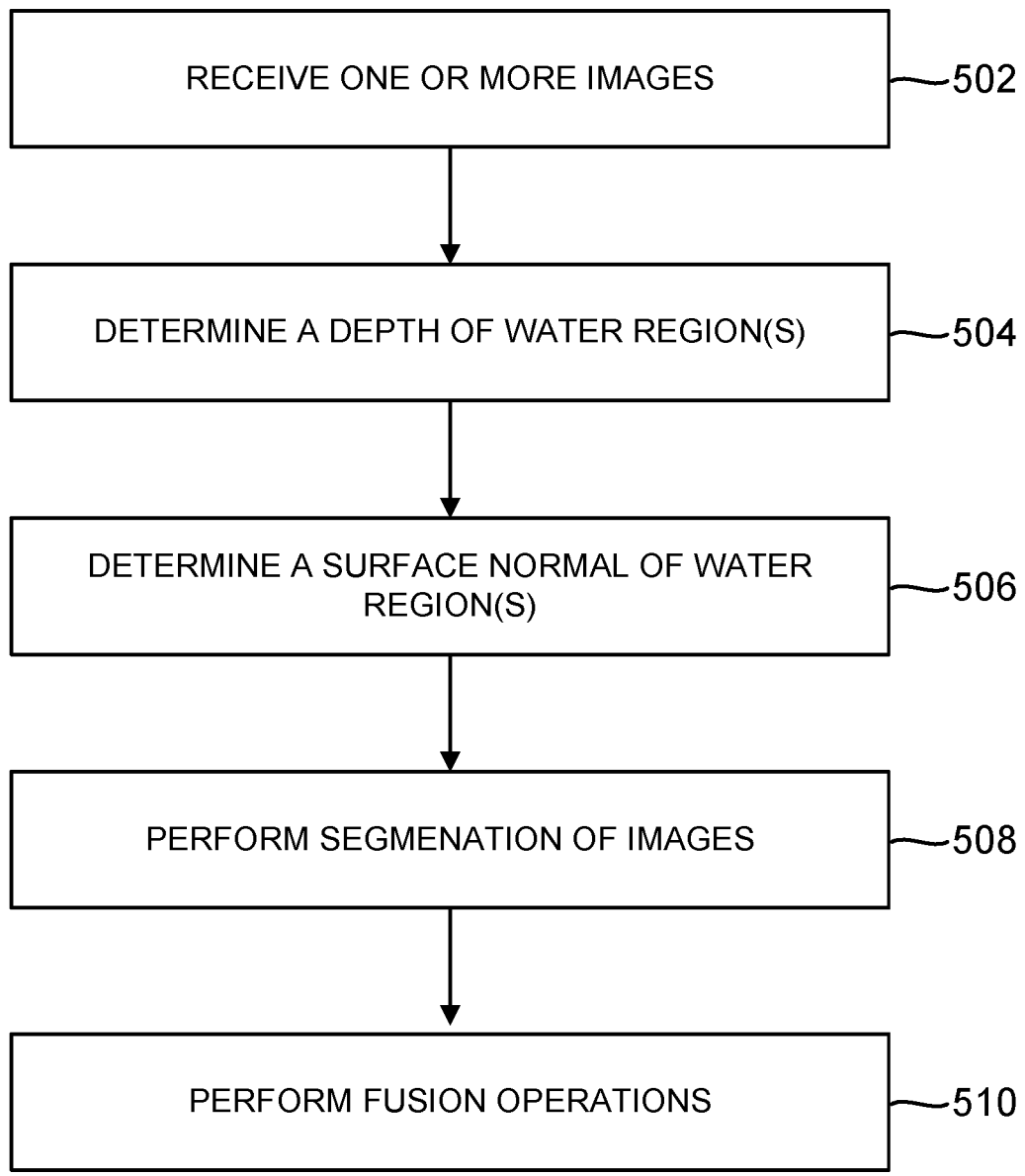
FIG. 5 is a flowchart illustrating an example method for segmenting out regions of water in accordance with the techniques of this disclosure.

FIG. 5 is a flowchart illustrating an example method for segmenting out regions with hazardous levels of water in an image in accordance with the techniques of this disclosure. Although described with respect to computing system 200 (FIG. 2), it should be understood that other devices may be configured to perform a method similar to that of FIG. 5.

In this example, machine learning system 204 may initially receive one or more images of a road (502). At least one of the images may include a water region and/or mirage. For example, the received image may include puddled water region 303 and/or flooding region 304. The depth estimation model 206A may analyze the received images to determine depth of the water region (504). For example, depth estimation model 206A may be trained on a set of images and their corresponding depth maps. Depth estimation model 206A may learn to associate the input images with their corresponding depth maps. The surface normal estimation model 206B may then analyze the received images to determine surface normal of the water region (506). For example, surface normal estimation model 206B may be trained on a set of images and their corresponding surface normal maps. Surface normal estimation model 206B may learn to associate the input images with their corresponding surface normal maps. Next, multi-class segmentation model 206C may perform multi-class segmentation of the received images (508). Computing system 200 may then perform one or more selective fusion operations on outputs of the depth estimation model 206A, surface normal estimation model 206B and multi-class segmentation model 206C to predict free parking spaces not containing hazardous water regions (510).

The following numbered clauses illustrate one or more aspects of the devices and techniques described in this disclosure.

Clause 1. A method comprising: receiving one or more images of a road, wherein at least one of the one or more images depicts a water region; analyzing, by one or more processors, the one or more images using a first machine learning model to determine depth of the water region; analyzing, by the one or more processors, the one or more images using a second machine learning model to determine surface normal of the water region; performing, by the one or more processors, using a third machine learning model, multi-class segmentation of the one or more images and performing one or more fusion operations on outputs of at least two of the first machine learning model, the second machine learning model and the third machine learning model to classify the water region.

Clause 2—The method of clause 1, further comprising: automatically determining, using a pre-defined set of rules, whether to park in a space containing the water region based on the classification of the water region and based on one or more parameters of a vehicle.

Clause 3—The method of clause 1, further comprising detecting one or more mirages.

Clause 4—The method of clause 3, wherein detecting the one or more mirages further comprises performing a fusion operation on outputs of the first machine learning model and the third machine learning model.

Clause 5—The method of any of clauses 2-3, wherein performing multi-class segmentation further comprises classifying pixels of the one or more images into one or more pre-defined categories.

Clause 6—The method of clause 5, wherein the one or more pre-defined categories include at least hazardous pixels and non-hazardous pixels.

Clause 7—The method of any of clauses 5-6, wherein the first machine learning model is trained using a training set of images and a plurality of depth maps corresponding to each image in the training set of images.

Clause 8—The method of any of clauses 1-7, further comprising classifying the water region using a fourth machine learning model, wherein the classifying includes decoding segmentation of the outputs of the one or more fusion operations.

Clause 9—The method of clause 7, wherein the first machine learning model is trained to minimize an error between a predicted depth map and a ground truth depth map using an absolute error loss function and/or squared error loss function.

Clause 10—The method of clause 9, wherein the second machine learning model is trained to minimize a difference between angles of a predicted surface normal vector and a ground truth surface normal vector by using a cosine similarity loss function.

Clause 11—The method of clause 7, wherein performing the one or more fusion operations further comprises applying attention mechanism to keys and values.

Clause 12—The method of clause 7, further comprising: determining one or more uncertainty estimates for the third machine learning model using at least one of Monte-Carlo dropout and Laplacian techniques.

Clause 13—An apparatus for detection and classification of water regions, the apparatus comprising a memory for storing one or more images; and processing circuitry in communication with the memory, wherein the processing circuitry is configured to: receive the one or more images, wherein at least one of the one or more images depicts a water region; analyze the one or more images using a first machine learning model to determine a depth of the water region; analyze the one or more images using a second machine learning model to determine a surface normal of the water region; perform using a third machine learning model, multi-class segmentation of the one or more images; and perform one or more fusion operations on outputs of at least two of the first machine learning model, the second machine learning model and the third machine learning model to generate a classification of the water region.

Clause 14—The apparatus of clause 13, wherein the processing circuitry is further configured to: automatically determine, using a pre-defined set of rules, whether to park in a space containing the water region based on the classification of the water region and based on one or more parameters of a vehicle.

Clause 15—The apparatus of clause 13, wherein the processing circuitry is further configured to detect one or more mirages.

Clause 16—The apparatus of clause 15, wherein the processing circuitry configured to detect the one or more mirages is further configured to perform a fusion operation on outputs of the first machine learning model and the third machine learning model.

Clause 17—The apparatus of any of clauses 14-15, wherein the processing circuitry configured to perform multi-class segmentation is further configured to classify pixels of the one or more images into one or more pre-defined categories.

Clause 18—The apparatus of clause 17, wherein the one or more pre-defined categories include at least hazardous pixels and non-hazardous pixels.

Clause 19—The apparatus of any of clauses 17-18, wherein the first machine learning model is trained using a training set of images and a plurality of depth maps corresponding to each image in the training set of images.

Clause 20—The apparatus of any of clauses 13-19, wherein the processing circuitry is further configured to classify the water region using a fourth machine learning model, wherein the classifying includes decoding segmentation of the outputs of the one or more fusion operations.

Clause 21—The apparatus of clause 19, wherein the first machine learning model is trained to minimize an error between a predicted depth map and a ground truth depth map using an absolute error loss function and/or squared error loss function.

Clause 22—The apparatus of clause 21, wherein the second machine learning model is trained to minimize a difference between angles of a predicted surface normal vector and a ground truth surface normal vector by using a cosine similarity loss function.

Clause 23—The apparatus of clause 19, wherein the processing circuitry configured to perform the one or more fusion operations is further configures to apply attention mechanism to keys and values.

Clause 24—The apparatus of clause 19, wherein the processing circuitry is further configured to determine one or more uncertainty estimates for the third machine learning model using at least one of Monte-Carlo dropout and Laplacian techniques.

Clause 25-A computer-readable medium storing instructions that, when applied by processing circuitry, causes the processing circuitry to: receive the one or more images, wherein at least one of the one or more images depicts a water region; analyze the one or more images using a first machine learning model to determine a depth of the water region; analyze the one or more images using a second machine learning model to determine a surface normal of the water region; perform using a third machine learning model, multi-class segmentation of the one or more images; and perform one or more fusion operations on outputs of at least two of the first machine learning model, the second machine learning model and the third machine learning model to generate a classification of the water region.

Clause 26—A device for detection and classification of water regions, the device comprising one or more means for performing steps of: receiving one or more images, wherein at least one of the one or more images depicts a water region; analyzing, by one or more processors, the one or more images using a first machine learning model to determine a depth of the water region; analyzing, by the one or more processors, the one or more images using a second machine learning model to determine a surface normal of the water region; performing, by the one or more processors, using a third machine learning model, multi-class segmentation of the one or more images; and performing one or more fusion operations on outputs of at least two of the first machine learning model, the second machine learning model and the third machine learning model to generate a classification of the water region.

Clause 27—The device of clause 26, wherein the one or more means comprise one or more processors implemented in circuitry.

Clause 28—The device of clause 27, further comprising a memory to store the one or more images.

Clause 29—The device of clause 26, further comprising a display configured to display the classification of the water region.

Clause 30—The device of clause 26, wherein the device comprises one or more of a camera, a computer, a mobile device, a broadcast receiver device, or a set-top box.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving one or more images, wherein at least one of the one or more images depicts a water region;
   analyzing, by one or more processors, the one or more images using a first machine learning model to determine a depth of the water region;
   analyzing, by the one or more processors, the one or more images using a second machine learning model to determine a surface normal of the water region;
   performing, by the one or more processors, using a third machine learning model, multi-class segmentation of the one or more images; and
   performing one or more fusion operations on outputs of at least two of the first machine learning model, the second machine learning model and the third machine learning model to generate a classification of the water region.

2. The method of claim 1, further comprising: automatically determining, using a pre-defined set of rules, whether to park in a space containing the water region based on the classification of the water region and based on one or more parameters of a vehicle.

3. The method of claim 1, further comprising detecting one or more mirages.

4. The method of claim 3, wherein detecting the one or more mirages further comprises performing a fusion operation on outputs of the first machine learning model and the third machine learning model.

5. The method of claim 1, wherein performing multi-class segmentation further comprises classifying pixels of the one or more images into one or more pre-defined categories.

6. The method of claim 5, wherein the one or more pre-defined categories include at least hazardous pixels and non-hazardous pixels.

7. The method of claim 1, wherein the first machine learning model is trained using a training set of images and a plurality of depth maps corresponding to each image in the training set of images.

8. The method of claim 1, further comprising:
   classifying the water region using a fourth machine learning model, wherein the classifying includes decoding segmentation of the outputs of the one or more fusion operations.

9. The method of claim 7, wherein the first machine learning model is trained to minimize an error between a predicted depth map and a ground truth depth map using an absolute error loss function and/or squared error loss function.

10. The method of claim 9, wherein the second machine learning model is trained to minimize a difference between angles of a predicted surface normal vector and a ground truth surface normal vector by using a cosine similarity loss function.

11. The method of claim 7, wherein performing the one or more fusion operations further comprises applying attention mechanism to keys and values.

12. The method of claim 7, further comprising: determining one or more uncertainty estimates for the third machine learning model using at least one of Monte-Carlo dropout and Laplacian techniques.

13. An apparatus for detection and classification of water regions, the apparatus comprising:
   a memory for storing one or more images; and
   processing circuitry in communication with the memory, wherein the processing circuitry is configured to:
      receive the one or more images, wherein at least one of the one or more images depicts a water region;
      analyze the one or more images using a first machine learning model to determine a depth of the water region;
      analyze the one or more images using a second machine learning model to determine a surface normal of the water region;
      perform using a third machine learning model, multi-class segmentation of the one or more images; and
      perform one or more fusion operations on outputs of at least two of the first machine learning model, the second machine learning model and the third machine learning model to generate a classification of the water region.

14. The apparatus of claim 13, wherein the processing circuitry is further configured to:
   automatically determine, using a pre-defined set of rules, whether to park in a space containing the water region based on the classification of the water region and based on one or more parameters of a vehicle.

15. The apparatus of claim 13, wherein the processing circuitry is further configured to detect one or more mirages.

16. The apparatus of claim 15, wherein the processing circuitry configured to detect the one or more mirages is further configured to perform a fusion operation on outputs of the first machine learning model and the third machine learning model.

17. The apparatus of claim 13, wherein the processing circuitry configured to perform multi-class segmentation is further configured to classify pixels of the one or more images into one or more pre-defined categories.

18. The apparatus of claim 17, wherein the one or more pre-defined categories include at least hazardous pixels and non-hazardous pixels.

19. The apparatus of claim 13, wherein the first machine learning model is trained using a training set of images and a plurality of depth maps corresponding to each image in the training set of images.

20. The apparatus of claim 13, wherein the processing circuitry is further configured to classify the water region using a fourth machine learning model, wherein the classifying includes decoding segmentation of the outputs of the one or more fusion operations.

21. The apparatus of claim 19, wherein the first machine learning model is trained to minimize an error between a predicted depth map and a ground truth depth map using an absolute error loss function and/or squared error loss function.

22. The apparatus of claim 21, wherein the second machine learning model is trained to minimize a difference between angles of a predicted surface normal vector and a ground truth surface normal vector by using a cosine similarity loss function.

23. The apparatus of claim 19, wherein the processing circuitry configured to perform the one or more fusion operations is further configures to apply attention mechanism to keys and values.

24. The apparatus of claim 19, wherein the processing circuitry is further configured to determine one or more uncertainty estimates for the third machine learning model using at least one of Monte-Carlo dropout and Laplacian techniques.

25. A non-transitory computer-readable medium storing instructions that, when applied by processing circuitry, causes the processing circuitry to:
receive one or more images, wherein at least one of the one or more images depicts a water region;
analyze the one or more images using a first machine learning model to determine a depth of the water region;
analyze the one or more images using a second machine learning model to determine a surface normal of the water region;
perform using a third machine learning model, multi-class segmentation of the one or more images; and
perform one or more fusion operations on outputs of at least two of the first machine learning model, the second machine learning model and the third machine learning model to generate a classification of the water region.

26. A device for detection and classification of water regions, the device comprising one or more means for performing steps of:
receiving one or more images, wherein at least one of the one or more images depicts a water region;
analyzing, by one or more processors, the one or more images using a first machine learning model to determine a depth of the water region;
analyzing, by the one or more processors, the one or more images using a second machine learning model to determine a surface normal of the water region;
performing, by the one or more processors, using a third machine learning model, multi-class segmentation of the one or more images; and
performing one or more fusion operations on outputs of at least two of the first machine learning model, the second machine learning model and the third machine learning model to generate a classification of the water region.

27. The device of claim 26, wherein the one or more means comprise one or more processors implemented in circuitry.

28. The device of claim 27, further comprising a memory to store the one or more images.

29. The device of claim 26, further comprising a display configured to display the classification of the water region.

30. The device of claim 26, wherein the device comprises one or more of a camera, a computer, a mobile device, a broadcast receiver device, or a set-top box.

* * * * *